(12) United States Patent
Gerdes

(10) Patent No.: US 6,877,632 B2
(45) Date of Patent: Apr. 12, 2005

(54) TANK CAP WITH FREE TRAVEL

(75) Inventor: Ralf Gerdes, Kerpen-Sindorf (DE)

(73) Assignee: Gerdes GmbH, Kerpen-Sindorf (DE)

( * ) Notice: Subject to any disclaimer, the term of this patent is extended or adjusted under 35 U.S.C. 154(b) by 0 days.

(21) Appl. No.: 10/295,224

(22) Filed: Nov. 14, 2002

(65) Prior Publication Data
US 2003/0089717 A1 May 15, 2003

(30) Foreign Application Priority Data
Nov. 15, 2001 (DE) .................................. 201 18 623 U

(51) Int. Cl.[7] .................................................. B65D 51/16
(52) U.S. Cl. ............................ 220/303; 220/DIG. 33
(58) Field of Search ................................. 220/303, 288, 220/DIG. 33, DIG. 32, 293, 375, 302, 304, 203.05, 203.07, 86.2

(56) References Cited

U.S. PATENT DOCUMENTS

| | | | | |
|---|---|---|---|---|
| 3,715,075 A | * | 2/1973 | Blau et al. ................... 220/288 |
| 4,083,209 A | * | 4/1978 | Sloan, Jr. ...................... 70/165 |
| 4,142,648 A | * | 3/1979 | Johnson et al. ........ 220/203.02 |
| 4,142,756 A | | 3/1979 | Henning et al. |
| 4,252,246 A | * | 2/1981 | Johnson et al. ............. 220/288 |
| 4,294,375 A | | 10/1981 | Gerdes |
| 4,299,102 A | * | 11/1981 | Aro .............................. 70/165 |
| 4,337,873 A | * | 7/1982 | Johnson ................. 220/203.02 |
| 4,458,824 A | * | 7/1984 | Baker et al. ................. 220/315 |
| 4,527,406 A | * | 7/1985 | Baker .......................... 70/165 |
| 4,676,390 A | | 6/1987 | Harris |
| 4,678,097 A | * | 7/1987 | Crute .......................... 220/288 |
| 4,765,505 A | | 8/1988 | Harris |
| 4,768,677 A | * | 9/1988 | Kitsukawa ................... 220/288 |
| 4,795,050 A | | 1/1989 | Smith et al. |
| 4,809,869 A | * | 3/1989 | Cosgrove et al. ........... 220/288 |
| 4,854,471 A | * | 8/1989 | Kasugai et al. ............. 220/288 |
| 4,887,733 A | | 12/1989 | Harris |
| 5,108,001 A | | 4/1992 | Harris |
| 5,183,173 A | * | 2/1993 | Heckman ............... 220/203.07 |
| 5,242,075 A | * | 9/1993 | Ott et al. ..................... 220/361 |
| 5,435,358 A | | 7/1995 | Kempka et al. |
| 5,449,086 A | | 9/1995 | Harris |
| 5,462,190 A | | 10/1995 | Lienhart et al. |
| 5,480,055 A | | 1/1996 | Harris et al. |
| 5,520,300 A | * | 5/1996 | Griffin ........................ 220/210 |
| 5,732,841 A | | 3/1998 | Jocic et al. |
| 5,732,842 A | | 3/1998 | Krause et al. |
| 5,794,806 A | | 8/1998 | Harris et al. |
| 5,974,806 A | | 11/1999 | Pekola et al. |
| 6,076,695 A | | 6/2000 | Palvoelgyi et al. |
| 6,209,746 B1 | * | 4/2001 | Gerdes ........................ 220/288 |
| 6,325,233 B1 | * | 12/2001 | Harris ......................... 220/288 |

FOREIGN PATENT DOCUMENTS

GB    1326919    8/1973

* cited by examiner

Primary Examiner—Lien M. Ngo
(74) Attorney, Agent, or Firm—Scott R. Hansen; Fulwider Patton Lee & Utecht, LLP

(57) ABSTRACT

A tank cap with free travel to close a fuel tank of a motor vehicle can be screwed on a filler neck of the fuel tank so that it seals via rotational movement around a rotational axis and features a closure body having a transverse support and a cap body having a transverse support. One of the supports includes a contact surface and a raised outer area that serves as a limit stop. The cap body is pivoted for rotational movement relative to the closure body through a free travel angle α that is limited by the limit stop.

14 Claims, 2 Drawing Sheets

TANK CAP WITH FREE TRAVEL

RELATED APPLICATIONS

This application claims priority under the Paris Convention based on German Utility Model Application No. 201 18 623.3, filed Nov. 15, 2001.

BACKGROUND OF THE INVENTION

1. Field of the Invention

The invention relates to a tank cap with free travel to close a fuel tank of a motor vehicle, which can be screwed on a filler neck of the fuel tank so that it seals via rotational movement around a rotational axis and features an inner closure body and a cap body, which is pivoted on the closure body around a free travel angle delimited by a first limit stop and a second limit stop.

2. Description of the Related Art

A tank cap is known from German printed patent specification 199 10 684, which corresponds to Patent No. U.S. Pat. No. 6,209,746. In the case of this known tank cap, the free travel is provided to prevent the cap from being unintentionally rotated by sheet metal edges that move in the case of an accident and being opened as a result. For this purpose the cap body is rotatable relative to the closure body, whereby a carrier of the one component is moved against a first and a second limit stop of the respective other component so that force is generated after the free travel is overcome. A spring, which holds the tank cap in a defined home position, can be arranged between the two components to guarantee that a free travel angle must always be overcome in the opening rotational direction before the generation of force becomes active. Another holding agent can be provided as an alternative to a spring, for instance an easy locking connection, which holds the tank cap at the second limit stop after it is screwed in and thus the locking force must be overcome in order to unscrew it.

In addition to these functional components, ventilation is normally provided in the interior of the tank cap, which is realized via a spring-loaded valve. In addition, most of the time known tank cap features a ratchet connection that guarantees a limitation of the torque in the closing direction so that overturning the screw connection or the bayonet connection in the filler neck and thus damage to the fastening mechanism can be avoided.

The known tank caps have the disadvantage that the limit stops must be realized using pins or comparable components that can only be produced very expensively with sufficient accuracy. Moreover, there exists the danger that once the pin lengths exceed a certain extent the limit stops cannot withstand the mechanical stress of the torque transmission and thus an error can occur. Finally, in most cases the known tank cap can be put together incorrectly so that a malfunction occurs from the limit stops not being arranged at the planned for positions, because the closure body relative to the cap body was put together rotationally misaligned relative to the target position for example.

Hence, those skilled in the art have recognized a need for a tank cap with free travel that can be mounted easily and is cost-effective to manufacture, whereby reliable force transmission from the cap body to the closure body remains guaranteed. The invention fulfills these needs and others.

SUMMARY OF THE INVENTION

Briefly and in general terms, the invention relates to a tank cap for closing a fuel tank of a motor vehicle. The cap can be screwed on a filler neck of the fuel tank so that it seals via rotational movement around a rotational axis and features an inner closure body and a cap body, which is pivoted on the closure body around a free travel angle α limited by a first limit stop and a second limit stop. The closure body features a lower transverse support and the cap body features an upper transverse support connected rotatably around the rotational axis of the tank cap with the lower transverse support, whereby in the lower transverse support and/or the upper transverse support a contact surface recessed relative to at least one raised outer area is arranged.

DETAILED DESCRIPTION OF THE PREFERRED EMBODIMENTS

Figure 1:
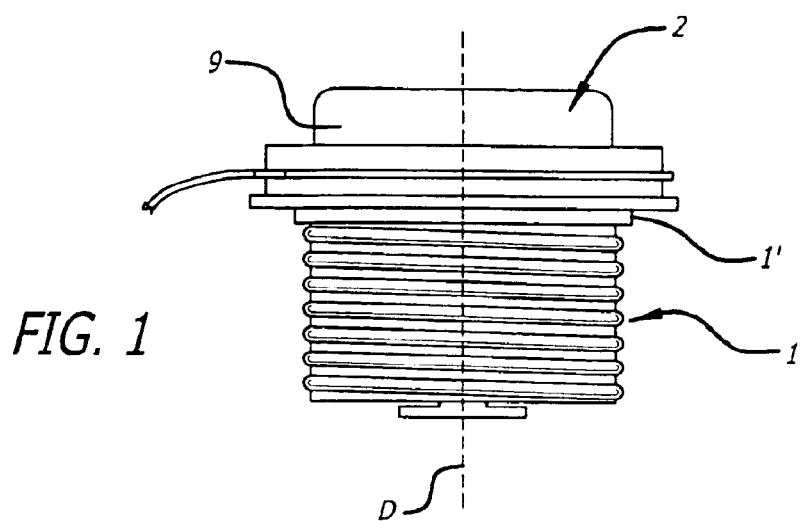
FIG. 1 shows a side view of a tank cap.

With reference to FIGS. 1–5, a tank cap with free travel is shown that can be mounted easily and is cost-effective to manufacture includes a closure body 1 that features a lower transverse support 4 and a cap body 2 that features an upper transverse support 3 connected rotatably around the rotational axis D of the tank cap with the lower transverse support. In the lower transverse support 4 and/or the upper transverse support 3 a contact surface 6 recessed relative to at least one raised outer area 5 is arranged.

Due to the development of the tank cap in accordance with the invention, malfunctions can now be avoided due to the design of the lower and upper transverse supports 3, 4. The two supports 3, 4, which are preferably embodied to be bridge-like, lie on top of one another in a mounted state, whereby they penetrate each other partially. A recessed contact surface 6 is arranged on one side or each on both sides in the area of the penetration so that the two transverse supports 3, 4 are pivoted on top of one another, whereby the contact surface 6 is limited at least on one side by a raised outer area 5, which in this case forms a limit stop 11.

It is preferred that the contact surface 6 be embodied as an even surface, whereby it is unimportant for the function whether this recessed contact surface is arranged in the lower, the upper or in both transverse supports 3, 4. As is also already the case with the known tank caps, the closure body 1 can be formed to include a hollow cylindrical housing so that, in the case of the lower and upper transverse supports 3, 4 that are embodied to be bridge-like, the lower transverse support 4 is fastened with both its ends to the inner surface shell 12 of the closure body 1. In this context "fastened" means that a connection is provided between the lower transverse support 4 and the inner surface shell 12, whereby this can be realized either by an adhesive connection or a clamped joint or the component can also be manufactured from one piece together with the transverse support. The latter is offered in particular in cases where the closure body 1 is manufactured of plastic in an injection molding process. In this case, the lower transverse support 4 can be used as a sprue channel gate, which also prevents undesired material weakening from occurring as a consequence of solidified flow fronts in the area of the transverse support, which has special significance for the mechanical function of the tank cap.

First and the second limit stops 11', 11" to limit the free travel angle α are formed in the case of the tank cap in accordance with the invention by the raised outer areas 5', 5" of the lower transverse support 4. These raised outer areas 5', 5" can be provided on both sides of the recessed contact surface 6, however, it is also possible, and particularly preferred if both transverse supports 3, 4 are provided with a recessed contact surface 6, so that a raised outer area 5 be provided only on one side of the recessed contact surface. In this case (not shown), the raised area of the lower transverse support assumes the function of the first limit stop and the raised area of the upper transverse support assumes the function of the second limit stop or vice versa.

The lower transverse support 4 and the upper transverse support 3 can be embodied as a flat, smooth-surface bridge, whereby the shape of the bridge can be selected as desired to large extent. The raised outer areas 5 can be designed in such a way that linear or surface pressure is produced when engaging the opposite transverse support.

The upper transverse support 3 can be connected with the cap body 2 to be a single part, i.e., it can be molded in the lower side of the cap material. In addition to the upper transverse support 3, the cap 2 can also feature a wave-like mandrel, via which the cap body is connected rotatably with closure body. A torsion spring or even a horizontal helical spring, such as disclosed in Patent No. U.S. Pat. No. 6,209,746, can be integrated into this connection thereby guaranteeing a resetting of the cap into a defined position.

The special development of the first and second limit stops 11', 11" via the lower and upper transverse supports 3, 4 also makes it possible to realize an elastic force transmission due to an appropriate selection of material and shaping of the transverse supports so that after overcoming the free travel angle α the operator perceives the limit stop as a harmonic transition of the force transmission. The lower and the upper transverse supports 3, 4 are not specified in terms of their thickness, just the flexural strength and the ultimate tensile strength should be sufficiently dimensioned in a direction parallel to the rotational axis D.

However, since stress in this direction does not occur directly, this does not produce a particularly high requirement for dimensioning. In the rotational direction, however, the raised outer areas 5 must be connected with the cap body 2 or with the closure body 1 in such a way that they can transmit the torque. The maximum torque in this connection is prescribed as a rule by the operator's force, whereby an additional ratchet connection should be provided as a torque limitation so that damage can be reliably avoided.

In addition, known tank caps for the most part feature the possibility of suctioning ambient air. This compensates for negative pressure due to the volume withdrawn by the fuel preparation. For this purpose, in the case of the known tank caps, a spring-loaded valve 32 is arranged in the housing of the closure body 1, which valve renders the influx of ambient air possible when applying negative pressure, and with atmospheric pressure or even excess pressure, seals the tank cap, however. Excess pressure can occur in particular in cases of accidents if the fuel tank is heated as a consequence of a vehicle fire. In this case, volatile and combustible gases must be prevented from exiting from the fuel tank at least for a certain period of time.

The disadvantage of this solution, however, is that dirt particles or drops of water are frequently suctioned along with the suctioned ambient air. Even if a fuel filter is provided in the area of the further mixture, these particles are undesirable, especially since the fuel filter as a rule is not in a position to filter out moisture from the fuel. In order to avoid this, the tank cap in accordance with the invention features at least one air collection space 13 for the collection and interim storage of the suctioned ambient air. An air inlet into the filler neck is formed by the inlet openings 7, which connect the air collection space 13 with the environment, and an overflow possibility 8, which connects the air collection space 13 with the interior of the filler neck 14.

Due to this development of the tank cap, the air can now be calmed to begin with when passing through the cap into the air collection space 13, which results in foreign bodies and undesired gases being able to separate from the ambient air. Due to the overflow possibility 8, a portion of the calmed ambient air flows into the housing 15, whereby, as a result of the calming of the influxed air, dirt particles and gases separate so much from the calmed air that only purified air enters the filler neck 14. The dirt particles remain in the collection space 13, while, after the negative pressure suctioning the ambient air subsides, for instance when the motor is turned off and the supply of gasoline is interrupted, the other gases make their way through the inlet openings 7 into the open air again.

In another preferred development of this tank cap, the air collection space 13 is formed by an annular hollow space 16. This annular hollow space 16 surrounds the filler neck, whereby it is preferred that the inlet openings 7 be arranged in such a way that the ambient air can flow radially into the annular hollow space. For this purpose, a plurality of inlet openings 7 can be distributed equidistant over the circumference.

With this development, the closure body 1 preferably features a supporting flange 1', which can extend outward in particular at a right angle to the rotational axis D. A gasket 17 is positioned beneath the flange 1' such that the gasket may be compressed between the flange and an edge 18 of the filler neck. In the case of this development, the supporting flange 1' is connected with the cap body 2, for example via a snap connection, and the inlet openings 7 can be arranged in the transition area from the supporting flange 1' to the remaining part, i.e., housing 15, of the closure body 1.

The tank cap is constructed in such a way that in the case of an accident a situation is avoided where the closure body 1 is torn out of the filler neck. To this end, with the application of tensile force as a result of deformations to the outer cap body 2, a fracture point is provided, which breaks upon the occurrence of such forces, while the screw connection or ratchet connection of the closure body 1 with the filler neck is able to tolerate the force.

In order to form these safety features, the supporting flange 1' can be provided with a groove-shaped recess 19 on its underside or even on the upper side, which recess weakens the connection of the supporting flange with the remaining portion of closure body 1 thereby providing a target fracture location. If the cap body 2 is now connected with the outer edge of the supporting flange 1', with the occurrence of greater forces, the supporting flange will break off from the remaining part of the closure body 1 thereby effectively avoiding a loosening of the closure body from the filler neck. In addition to the annular groove 19, the inlet openings 7 contribute to the weakening of the material in this case.

Of course, instead of an annular air collection space 13 concentric to the rotational axis D, several air collection spaces can be provided, which are connected with the environment via individual inlet openings. An overflow area is created from the air collection space, which overflow possibility renders the admission of the calmed air into the filler neck possible. This overflow area can be realized in a variety of ways, in the simplest case it is a leakage between the cap body 2 and the closure body 1.

Normally, the cap body 2 is an injection molded plastic part that features a hand grip 9 projecting upward. This hand grip 9 is manufactured in such a way in an injection molding process that a corresponding groove 20 is produced on the hand grip on the underside of the cap body 2 in the area of the bridge-like elevation 21. This groove 20 is already adequate as an overflow possibility 8 if an annular groove 16 is provided as an air collection space 13. If, on the other hand, a plurality of air collection spaces is provided, an overflow possibility must naturally be created for each of the air collection spaces. This can occur, for example, by the underside of the cap body 2 remaining spaced from the upper side of the supporting flange 1' by using small distancing elements (not shown). The side edges of the supporting flange 1' should however be clamped into the cap body 2 in this design in such a way that direct entry of the ambient air into the closure body 1 is avoided so as not to diminish the effect of calming the inlet air.

As is already the case with known tank caps, the closure body 1 features a ratchet connection 10 by virtue of which a force transmission occurs when closing the tank cap. If the torque applied by a person exceeds a specific amount, the ratchet connection 10 slips through and damage to the plastic parts from too vigorous screwing into the often metallic filler neck can be avoided.

In the case of known tank caps, such as shown in Patent No. U.S. Pat. No. 6,209,746, a spring-loaded component is used to realize the ratchet function, which component is connected with the cap body and slides off into the hollow cylindrical closure body on an inner running surface. In accordance with the present invention, it is preferred that this ratchet connection be realized via a collar 10 manufactured of flexible material, which is connected with the closure body 1. In this case, the closure body 1 housing 15, which is inserted into the filler neck, has a running surface 22 on its inner surface shell 12 for the ratchet body 10, which is embodied as a ring element.

The outer surface shell 24 of the ratchet body 10 and the running surface 22 are each provided with locking teeth 25, whereby the locking teeth are embodied in such a way that they can slide off into one another in the closing direction and effect an interlocking hold in opposite opening rotational direction. To this end, two oblique planes 26, preferably manufactured of plastic, slide off one another in the closing direction, while steep locking edges 27 engage one another in the opening direction. By manufacturing the ratchet body 10 and the housing 15 from a flexible plastic material such as polyamide, the spring of prior caps can now be dispensed with and, along with a savings in manufacturing costs, an additional gain in safety is achieved since a malfunction from spring fracture is avoided. In addition, the assembly of the tank cap is clearly simpler due to this development.

Also in the case of the tank cap in accordance with the invention, in addition to the possibility of the ratchet body 10 slipping through, a free movement of the cap body 2 relative to the closure body 1 can be provided. This free movement is realized by a rotatable placement, for example of the ratchet body 10 relative to the cap body 2, if such is provided, or of the cap body 2 directly relative to the closure body 1, whereby first and a second limit stops 11', 11" are provided, which limit the free travel angle α. Normally an angle of between 90° and 180° is adequate as a free travel angle α since, in accordance with the invention, greater rotations cannot occur in the case of an accident.

FIG. 1 shows a tank cap, which is formed by a closure body 1 and a cap body 2 placed on the closure body. The cap body 2 features a hand grip 9, which the user can use to unscrew the cap body 2 along with the closure body 1 from the filler neck of a motor vehicle for example.

In order to seal the filler neck, the closure body 1 features a laterally projecting supporting flange 1', which is able to squeeze a seal 17 between the edge 18 of the filler neck and the lower side of the supporting flange 1'. To do so, the tank cap is rotated around the rotational axis D, whereby a free travel angle α is provided in the embodiment shown, which must first be overcome in order for the closure body 1 and the cap body 2 to engage one another.

Figure 2:
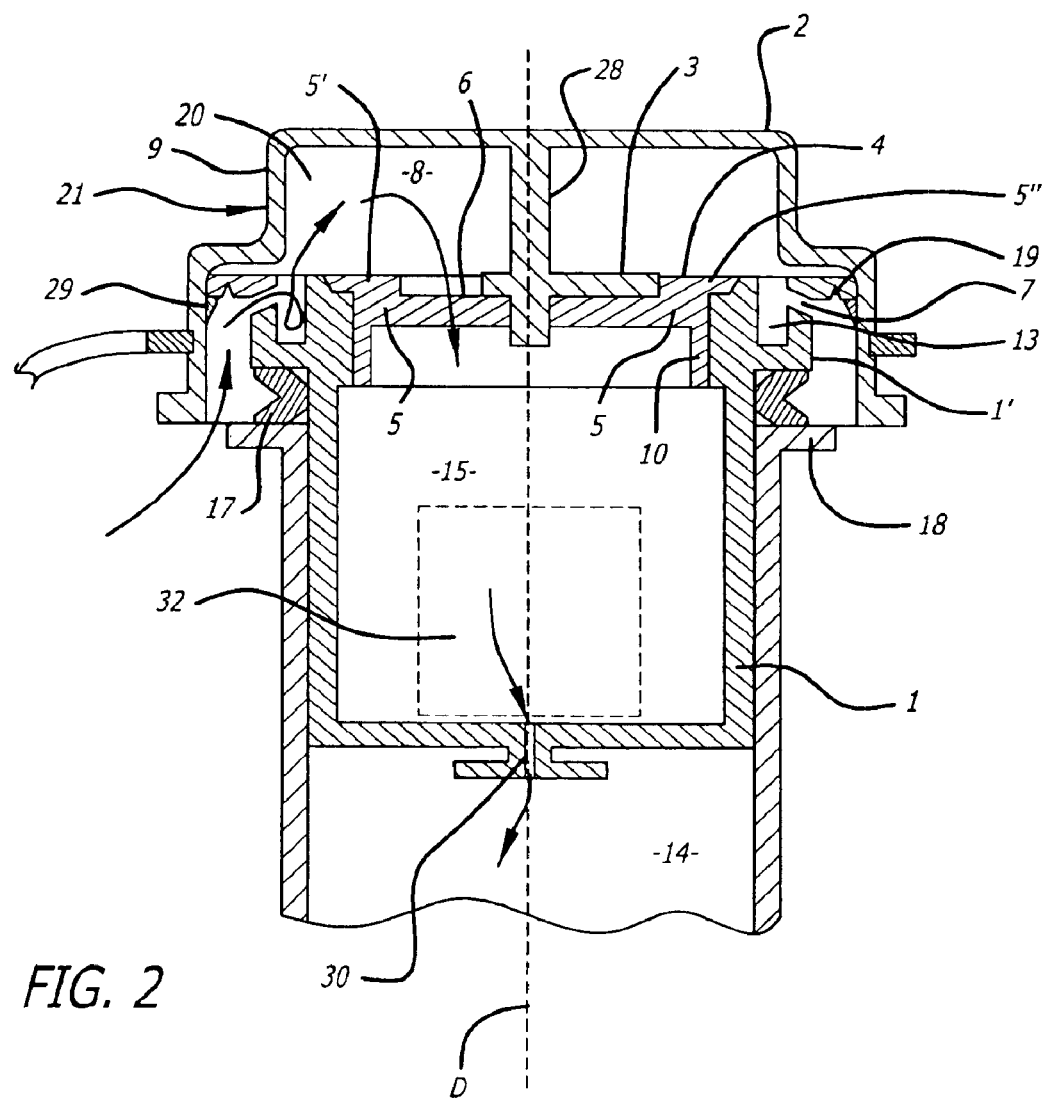
FIG. 2 shows a sectional view of the tank cap shown in FIG. 1 with suction purification and free travel.

FIG. 2 shows a sectional side view of the tank cap shown in FIG. 1. Inside the closure body 1 the cap features a downward projecting pin 28 concentric to rotational axis D, which is connected with an upper transverse support 3 and is pivoted in the area below this, in a lower transverse support 4 of the closure body 1. The upper transverse support 3 is supported on the lower transverse support 4, whereby a withdrawal safety mechanism is provided, which prevents the upper cap body 2 from being withdrawn from the closure body 1 in the direction of the rotational axis D. The withdrawal safety mechanism can be formed by a special component or even be realized via a plug-type connector.

It is preferred that the withdrawal safety mechanism be formed, however, by the cap body 2 extending laterally over the supporting flange 1' of the closure body 1 and being held on this supporting flange 1' by lateral snap connections 29, which are well known in the art. A readjusting spring, such as shown in Patent No. U.S. Pat. No. 6,209,746, can be provided in the area of the cap body 2, which spring is preferably arranged horizontally and resets the cap to a defined limit stop so that it is not opened unintentionally in the case of an accident, but must always first overcome the free travel angle α in the opening direction.

Figure 3:
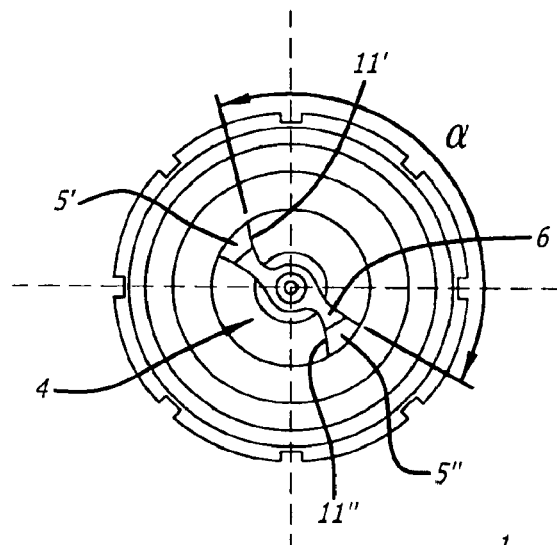
FIG. 3 shows a top view of the closure body of the tank cap shown in FIGS. 1 and 2.
Figure 5:
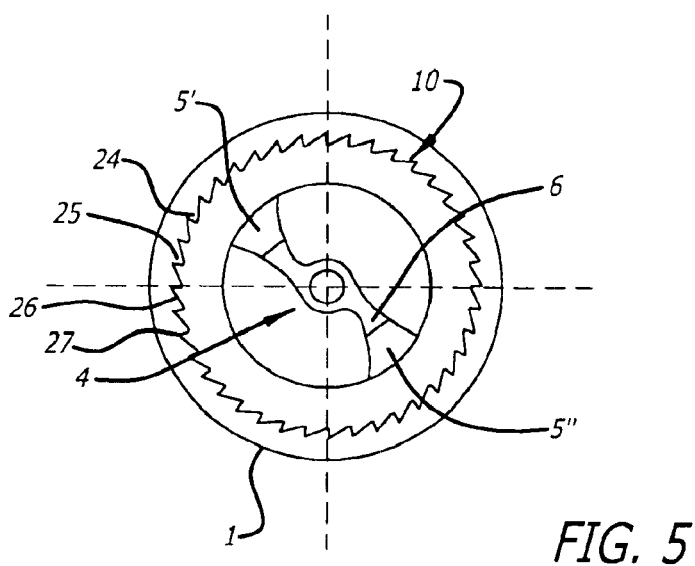
FIG. 5 shows a view from below of the ratchet body of the tank cap shown in FIGS. 1 through 4.

The lower transverse support 4 features a raised outer area 5, which is formed in the case shown by a first raised outer area 5' and a second raised outer area 5". Arranged between these is the contact surface 6 on which the upper transverse support 3 is supported. This contact surface 6 can be seen especially well in FIGS. 3 and 5, whereby the limitation of the free travel angle α is guaranteed by the raised outer areas 5', 5". In this connection, FIG. 3 shows a top view of the closure body 1, while FIG. 5 shows a view from below of the ratchet body 10 inserted into the closure body 1.

The ratchet body 10 is pivoted in the closure body 1, whereby in the lower area laterally projecting locking teeth 25 made of flexible plastic material realize a limitation of the torsional force. In the closing direction, these teeth 25 slip through, starting at a specific torque, and damage to the closure body 1 or the seal 17 is precluded. These locking teeth 25 engage in the corresponding catches 25 of the closure body 1 in an interlocking manner in the opening direction and the opening torque can be transmitted in any case.

Figure 4:
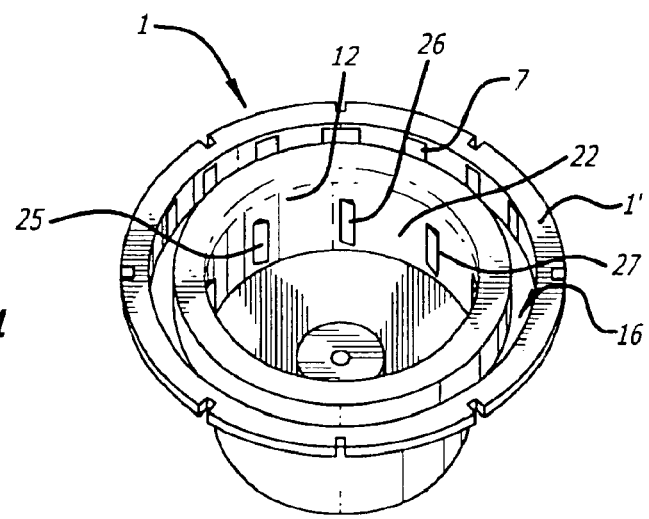
FIG. 4 shows a three-dimensional view of the closure body shown in FIG. 3.

FIG. 4 shows the closure body 1 in a three-dimensional representation, whereby in this case the possibility of cleaning the suction air can be seen particularly well. To this end, the closure body 1 features a circumferential groove 16 in the upper area, which is connected via inlet openings 7 with the ambient air. From this groove 16 the ambient air can flow through an overflow area 8, formed in this case (as shown in FIG. 2) by the hollow hand grip 9, into the interior of the closure body 1 and through an inlet opening 30 arranged therein into the interior of the filler neck 14. The inlet opening 30 is secured from gas escaping from the tank by a customary spring-loaded valve 32.

Inlet openings 7 are formed by bore holes distributed concentrically over the circumference of the groove 16, whereby the inflowing ambient air calms down to begin with in the groove and then, after solid matter is able to separate as a result of the calming of the flow within the groove, flows through the interior of the closure body 1 into the tank.

The lower area of the supporting flange 1' can be provided with a groove 19 to form a target fracture location thereby yielding protection from unintentional withdrawal of the closure body 1 from the filler neck in the case of the effect of longitudinal force on the cap body 2 from an accident in that the supporting flange 1' breaks off and is able to be removed together with the cap body 2.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A fuel cap for installation and removal relative to a filler neck of a fuel tank, said cap comprising:
    a closure body having a rotational axis and an associated transverse support aligned for rotation about the axis; and
    a cap body having a pin aligned with the axis of the closure body and a transverse support connected to the pin, the cap body and its transverse support positioned relative to the closure body and the closure-body transverse support such that the cap-body transverse support is aligned for rotation about the axis;
    wherein at least one of the transverse supports includes a contact surface and at least one raised area, the surface of the contact surface is recessed relative to the surface of the at least one raised area, the contact surface and a surface of the other transverse support lie on top of one another, and rotation of the cap body relative to the closure body is limited by interference between the at least one raised area and the other transverse support.

2. The fuel cap of claim 1 wherein the contact surface comprises an even surface in the center area of the transverse support.

3. The fuel cap of claim 1 wherein the closure body comprises a hollow cylindrical housing having an inner surface and the closure-body transverse support comprises opposite ends each secured to the inner surface of the housing.

4. The fuel cap of claim 1 wherein the closure-body transverse support is formed integral with the closure body.

5. The fuel cap of claim 1 wherein the cap-body transverse support is formed integral with the cap body.

6. The fuel cap of claim 1 wherein the transverse support having the contact surface comprise opposite ends, a first raised area at one end and a second raised area at the opposite end.

7. The fuel cap of claim 1 wherein the fuel neck includes an upper edge and the fuel cap further comprises:
    a flange extending outward from the the closure body; and
    a seal gasket surrounding the gasket and positioned beneath the flange;
    wherein upon installation of the housing into the filler neck the gasket is compressed to establish a seal between the gasket and at least one of the upper edge, housing and flange.

8. The fuel cap of claim 7 further comprising an air path between the environment and the interior of the filler neck wherein the air path circumvents the seal provided by the gasket.

9. The fuel cap of claim 8 wherein the air path comprises an air collection space formed by an annular hollow space surrounding the housing.

10. The fuel cap of claim 9 wherein the annular hollow space is formed by a circumferential groove between the housing and the vertical wall of the flange.

11. The fuel cap of claim 9 wherein the air path further comprises a plurality of inlet openings formed in the flange to provide fluid communication between the environment and the air collection space.

12. The fuel cap of claim 9 wherein the air path further comprises an overflow path in fluid communication with the air collection space and the interior of the filler neck.

13. The fuel cap of claim 12 wherein the cap body includes a hollow grip handle having an underside in fluid communication with the air collection space and the interior of the housing and the overflow path comprise the underside of the hollow grip handle.

14. The fuel cap of claim 12 wherein the housing includes an inlet opening between the interior of the housing and the interior of the filler neck and the overflow path further comprises the inlet opening.

* * * * *

UNITED STATES PATENT AND TRADEMARK OFFICE
CERTIFICATE OF CORRECTION

PATENT NO. : 6,877,632 B2
DATED : April 12, 2005
INVENTOR(S) : Ralf Gerdes

It is certified that error appears in the above-identified patent and that said Letters Patent is hereby corrected as shown below:

Title page,
Item [63], Foreign Application Priority Data, delete "201 18 623 U" and insert in its place -- 201 18 623.3 --.

Column 7,
Line 30, delete "instullation" and insert instead -- installation --.

Column 8,
Line 2, delete "un" and insert instead -- an --.

Signed and Sealed this

Nineteenth Day of July, 2005

JON W. DUDAS
*Director of the United States Patent and Trademark Office*